United States Patent Office 3,384,667
Patented May 21, 1968

3,384,667
PRODUCTION OF PRIMARY AND
SECONDARY AMINES
Lyle A. Hamilton, Pitman, N.J., assignor to Mobil Oil
Corporation, a corporation of New York
No Drawing. Filed Apr. 28, 1964, Ser. No. 363,283
8 Claims. (Cl. 260—585)

ABSTRACT OF THE DISCLOSURE

Primary and secondary amines are produced in preference to tertiary amines by reacting ammonia with an alcohol in the presence of a dehydrated crystalline aluminosilicate catalyst having pores of a size to selectively yield primary and secondary amines.

---

In the reaction of alcohols and ether compounds with ammonia to form substituted amines, mono-, di- and tri-substituted products (i.e. primary, secondary and tertiary amines) are ordinarily formed simultaneously according to the following reactions:

(1) $\quad ROR' + NH_3 \longrightarrow RNH_2 + R'OH$ (2) $\quad 2ROR' + NH_3 \longrightarrow R-\underset{H}{\underset{|}{N}}-H + 2R'OH$ and (3) $\quad 3ROR' + NH_3 \longrightarrow R-\underset{R}{\underset{|}{N}}-R + 3R'OH$ In the above equations, R' is either hydrogen or an organic radical and R is an organic radical. R and R' may also comprise the same or different organic moieties. Although both alcohols and ethers are operable in the synthesis of amines as described above, alcohols, generally speaking, are preferred while ethers are less desirable reactants.

In accordance with the present invention the compound reacted with ammonia is an alcohol of the general formula ROH, R is a hydrocarbon radical and may be a straight or branched chain aliphatic radical having from one to about eighteen carbons in the chain in addition to alicyclic groups, such as cyclohexyl and methyl cyclohexyl, aromatic groups, such as phenyl and naphthyl, an aralkyl group, such as a benzyl radical and various combinations and mixtures of the above.

In many instances, the mono- and di-substituted amine products are preferred to the tri-substituted products. For this reason, it is desirable to control the reaction to favor the formation of the mono- and di-substituted derivatives in preference to the tri-substituted amines. For example, diphenyl amine, phenyl alpha naphthylamine, phenyl beta naphthylamine, di-ethylamine and ethyl amine are commercially more significant than the corresponding tri-substituted products. Furthermore, mono- and di-substituted amines may be employed in the synthesis of other organic compounds by replacement of the amine hydrogen, whereas tri-substituted amines are for the most part used only as bases.

Accordingly, an object of the present invention is to provide a method for producing mono- and di-substituted amines in preference to tri-substituted amines.

Another object of the present invention is to provide a method for producing substituted amines by the reaction of ammonia with alcohols to produce mono- and di-substituted amines and to inhibit the production of tri-substituted amines.

In general, the present invention comprises producing mono-substituted amines and di-substituted amines by the reaction of ammonia with alcohols in the presence of crystalline metal aluminosilicate catalysts having pores of a diameter that pass or adsorb the mono-substituted and di-substituted products, but are too small to pass the tri-substituted amine products.

The pore size of the crystalline metal aluminosilicate catalyst is critical and must be specially selected in view of the reactants and the particular reaction products which are formed. Thus, for example, in the production of normal aliphatic amines, crystalline metal aluminosilicate catalysts having a pore diameter of about 5 Angstroms afford selective alkylation to mono- and di-aliphatic amines. In the production of carbocyclic or arylamines, crystalline metal aluminosilicate catalysts having pore diameters of about 10 Angstroms selectively yield mono- and di-carbocyclic or mono- and di-arylamines in preference to tri-carbocyclic or tri-arylamines.

The catalysts of the present invention are dehydrated crystalline metal aluminosilicates. Synthetic or natural crystalline metal aluminosilicates ordinarily are hydrated and are notable for the fact that the water of hydration may be removed without collapse of the crystalline structure. On dehydration, a highly porous product is formed which contains large numbers of interconnecting pores or passageways. Owing to the retention of its ordered crystalline structure, the pores are of a substantially constant diameter for a given species of crystalline metal aluminosilicate.

Crystalline metal aluminosilicates of the type useful in the present invention have the following general formula:

$$M_{2/n}O \cdot Al_2O_3 \cdot YSiO_2 \cdot ZH_2O$$

in the salt form, where $n$ is the valence of the metal cation M, Y is the number of moles of silica and $ZH_2O$ is the water of hydration.

Suitable crystalline aluminosilicates for use in the production of the catalysts of the present invention include both natural and synthetic crystalline aluminosilicates or zeolites.

A fairly wide variety of natural crystalline zeolites exist, and, among these, faujasite has been found to be an especially useful material for the preparation of the catalysts of this invention. Other satisfactory natural crystalline zeolites include, for example, analcite, paulingite, ptilolite, clinoptilolite, ferrierite, chabazite, gmelinite, levynite, erionite and mordenite.

Among the most suitable synthetic crystalline aluminosilicates are the synthetic faujasites, including both X and Y types which have a crystal structure corresponding to that of natural faujasite. The preparation of such X aluminosilicates is described in U.S. Patent 2,882,244 to Milton, issued Apr. 14, 1959. The preparation of the Y type is described in Belgian Patent 577,642.

Another important synthetic crystalline zeolite not having a corresponding natural form is Zeolite A. The preparation of this crystalline aluminosilicate is described in U.S. Patent 2,882,243 to Milton and 2,982,612 to Barrer et al.

Other suitable synthetic crystalline zeolites useful in the present invention include, for example: Y zeolite, B zeolite, E zeolite, F zeolite, G zeolite, H zeolite, K-G zeolite, J zeolite, L zeolite, M zeolite, K-M zeolite, Q zeolite, R zeolite, S zeolite, T zeolite, U zeolite, Z zeolite and others.

In addition to the designation of different crystalline forms of the aluminosilicates by letter prefixes, such as X, Y, A, etc., numerical prefixes are also employed to indicate the pore size of the particular material. For example, 4A describes a crystalline aluminosilicate having an A-type crystalline structure and a pore diameter of 4 Angstroms, 10X is an X-type crystalline aluminosilicate having a pore diameter of 100 Angstroms, and so forth.

It is characteristic of the crystalline aluminosilicates that the metal cation may be readily replaced by other metal cations or by hydrogen ions by ion-exchange treatment. For purposes of definition, however, hydrogen-exchanged crystalline aluminosilicates will also be referred to as crystalline metal aluminosilicates. Such treatment also influences the pore size of the material being treated and thereby controls the size of molecules that can be adsorbed. For example, the exchange of the original sodium ions of a 4A-type crystalline aluminosilicate with potassium ions reduces the size of the molecules that it can adsorb.

Cations which may be used to replace the original metal cations of crystalline aluminosilicates may include, for example, H, Ba, Ca, Ce, Li, Mg, K, Ag, Sr, Zn and others of Groups I, II and III of the Periodic Table.

The extent of the ion-exchange treatment may also be controlled so that only a portion of the original metal cations are replaced, yielding a product containing both original and substituted cations. Likewise, more than one replacement cation may be employed in the ion-exchange treatment. For example, a solution of a mixture of rare earth chlorides is satisfactory for use in such an ion-exchange treatment.

The crystalline metal aluminosilicates of the present invention may be employed alone or in combination with various binder or matrix materials. The physical form of the catalyst may also be adapted to use in any conventional catalytic system. For example, the catalyst may be prepared in the form of finely divided particles for use in a slurry or in fluidized bed systems, or the catalyst may be in the form of beads, pellets, or the like for use in fixed or moving bed catalysis.

Suitable binder or matrix materials with which the crystalline metal aluminosilicate may be mixed or composited include various organic and inorganic materials, such as resins, clays, gels and the like. The proportion of the catalyst composition which is the crystalline metal aluminosilicate may be varied widely and the composite or mixture may also be provided in the physical forms best suited to use in various catalytic systems.

A preferred catalyst comprises small particles of a crystalline metal aluminosilicate distributed in a matrix of a gel, such as conventional amorphous silica-alumina gel (10% alumina).

It should be noted, however, that these composite catalysts are selective only if the matrix or binder is substantially non-catalytic with respect to the particular reaction in which the composite catalyst is employed.

According to the present invention, it is essential that the catalyst be selected with respect to the nature of the reactant and product molecules, so that the pore size adsorbs only the mono- and di-substituted amines, and does not adsorb or pass the tri-substituted product. The particular crystalline metal aluminosilicate catalysts suitable for the conduct of a specific amine forming reaction must therefore be determined experimentally. However, some guide lines can be established for selecting the proper catalyst. In general, if the substituent groups are normal aliphatic radicals, a catalyst of relatively small pore size will be appropriate. If the substituent radicals are relatively large, such as aryl or saturated cyclic groups, then the size-selective catalyst ordinarily will be one having a relatively large pore diameter.

Likewise, the particular reaction conditions, such as temperature, pressure, amounts of reactants, etc., will be determined experimentally to produce optimum yield. However, rigid condition controls are not necessary to bring about a useful reaction and the production of some yield. For example, atmospheric pressure is satisfactory, the temperature may vary over a wide range and from about 200° C. to 300° C. is suitable but not exclusive and a mole ratio of about 2:1 ROR' to amine is satisfactory.

The following illustrative examples will assist a more complete understanding of the invention.

Example 1

Normal butanol and ammonia in a mole ratio of 2:1 are added to a reactor charged with hydrogen substituted mordenite as a catalyst at a liquid hourly spaced velocity of 1.0 and at a temperature of 200° C. The effluent is then analyzed. A conversion of 70% of the n-butanol is obtained by this method, 45 parts of which comprise monobutylamine and the balance dibutylamine. Tributylamine is not found in the conversion products.

Example 2

The process of Example 1 is repeated using a 5A molecular sieve catalyst at a temperature of 225° C. Eighty percent of the n-butanol is converted and the reaction products obtained are substantially the same as those of Example 1.

Example 3

The method of Example 2 is repeated with a 13X molecular sieve catalyst and approximately the same conversion is obtained as with the previous example. The products of the reaction comprise unreacted butanol and approximately 30% monobutylamine, 35% dibutylamine and 20% tributylamine. Thus, it can be seen the 13X catalyst pore openings are too large to prevent passage of the tributylamine.

Example 4

Tertiary butyl phenol and ammonia in a mole ratio of 2:1 are added to a reactor charged with rare earth ion-exchanged X faujasite as a catalyst at a liquid hourly space velocity of 0.5 and at a temperature of 250° C. The effluent product contains some free reactants and a mixture of t-butylaniline and di-(t-butylphenyl)amine. Tri-(t-butylphenyl)amine is not present in the effluent.

Example 5

Phenol and ammonia in a mole ratio of 2:1 are added to a reactor charged with 10X molecular sieves as a catalyst at a liquid hourly space velocity of 3.0 and a temperature 300° C. The effluent product contains some unreacted phenol and ammonia and a mixture of aniline and diphenyl amine.

The above examples illustrate not only the synthesis of amines utilizing a crystalline metal aluminosilicate catalyst but also the size-selectivity of the reaction whereby the production of relatively bulkier tri-substituted amines can be reduced by utilizing a catalyst with pore openings that are not large enough to admit the tri-substituted amine products.

Having disclosed the invention in some detail and with reference to specific examples and certain preferred embodiments, it will be obvious to those skilled in the art that various modifications or changes may be made in the methods described without departing from the spirit or scope of the invention as expressed in the following claims.

What is claimed is:

1. A method for producing primary and secondary amines in preference to tertiary amines, comprising reacting ammonia with an alcohol of the formula ROH, wherein R is a hydrocarbon radical containing from 1 to 18 carbon atoms, in the presence of a dehydrated crystalline aluminosilicate catalyst having pores with diameters in the range of about 5 to about 10 angstroms, said pores being of a diameter large enough to pass the primary and secondary amines but too small to promote the formation of tertiary amines.

2. The method of claim 1 wherein the catalyst is a sodium X faujasite molecular sieve.

3. The method of claim 1 wherein the catalyst is a rare earth ion-exchanged X faujasite molecular sieve.

4. The method of claim 1 wherein R is an aliphatic radical.

5. A method for the production of monobutylamine and dibutylamine comprising contacting n-butanol with ammonia in the presence of a dehydrated crystalline metal aluminosilicate catalyst, said catalyst having pores with diameters in the range of about 5 to 10 angstroms, said pores being of a diameter large enough to pass monobutylamine and dibutylamine but not large enough to pass tributylamine.

6. The method of claim 5 wherein n-butanol is contacted with ammonia in a mole ratio of about 2:1 at a liquid hourly space velocity of about 1.0 and at a temperature of about 200° C.

7. The method of claim 5 wherein the catalyst is hydrogen substituted mordenite.

8. The method of claim 5 wherein the catalyst is 5 A. molecular sieve.

References Cited

UNITED STATES PATENTS 3,140,322   7/1964   Frilette et al.

CHARLES B. PARKER, *Primary Examiner.*

R. L. RAYMOND, *Assistant Examiner.*

UNITED STATES PATENT OFFICE
CERTIFICATE OF CORRECTION

Patent No. 3,384,667  
May 21, 1968

Lyle A. Hamilton

It is hereby certified that error appears in the above numbered patent requiring correction and that the said Letters Patent should read as corrected below.

Column 2, line 69, "100" should read -- 10 --. Column 4, line 1, "spaced velocity" should read -- space velocity --; after line 69, insert 5. The method of claim 1 wherein the pores have a diameter of about 5 Angstroms.

6. The method of claim 1 wherein the pores have a diameter of about 10 Angstroms.

line 70, "5." should read -- 7. --. Column 5, line 3, "6." should read -- 8. --; line 7, "7." should read -- 9. --. Column 6, line 1, "8." should read -- 10. --. In the heading to the printed specification, line 7, "8 Claims" should read -- 10 Claims --.

Signed and sealed this 4th day of November 1969.

(SEAL)  
Attest:

EDWARD M. FLETCHER, JR.  
Attesting Officer

WILLIAM E. SCHUYLER, JR.  
Commissioner of Patents